Dec. 16, 1930.  D. F. YOUNGBLOOD  1,785,471
MASTER CONTROL SYSTEM FOR CELL DOORS AND LOCKS
Filed Aug. 15, 1929  2 Sheets-Sheet 1

INVENTOR
D. F. Youngblood
BY
ATTORNEYS

Dec. 16, 1930. D. F. YOUNGBLOOD 1,785,471
MASTER CONTROL SYSTEM FOR CELL DOORS AND LOCKS
Filed Aug. 15, 1929 2 Sheets-Sheet 2
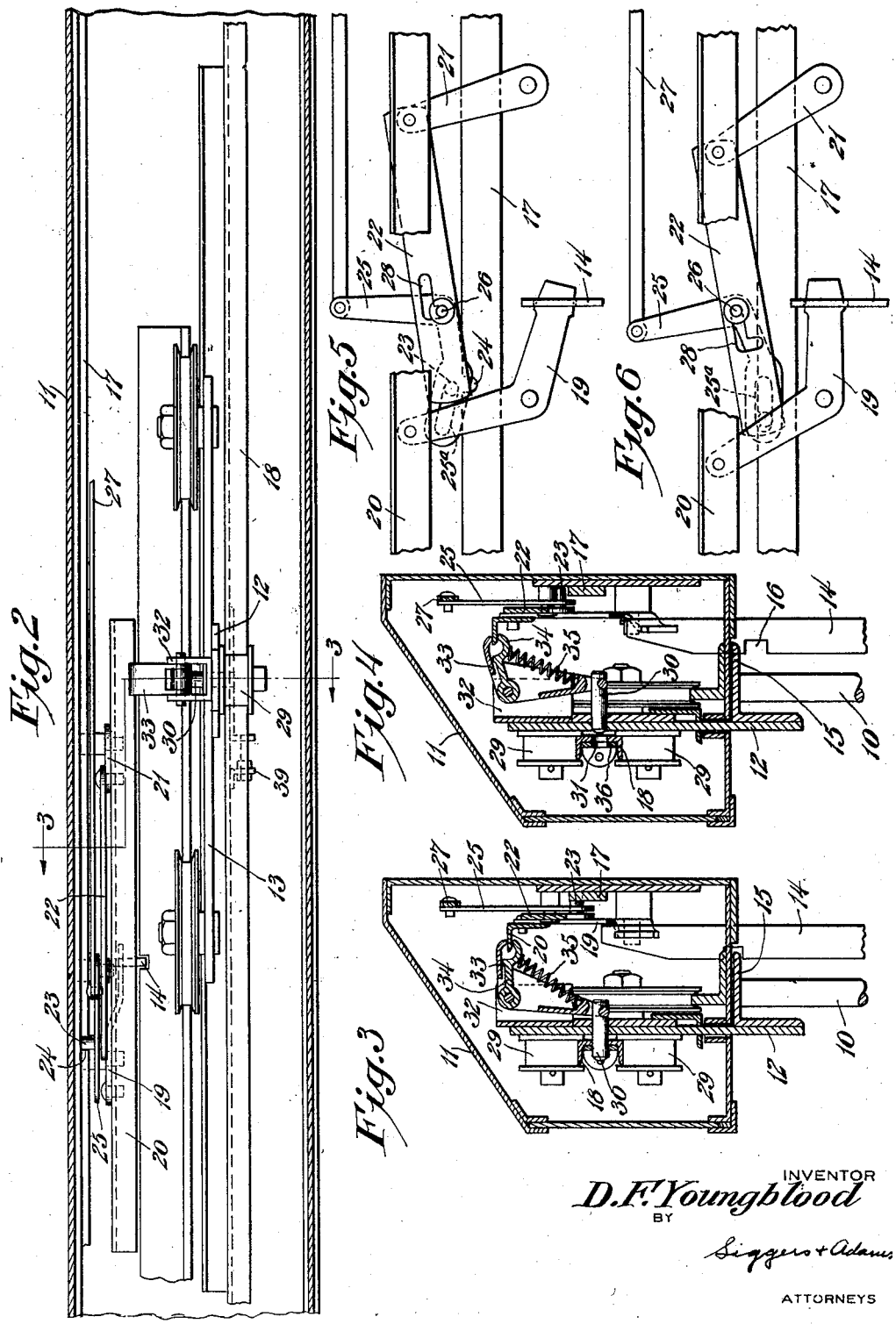
INVENTOR
D. F. Youngblood
BY
Siggers + Adams
ATTORNEYS Patented Dec. 16, 1930

1,785,471

UNITED STATES PATENT OFFICE

DAVID FRANKLIN YOUNGBLOOD, OF SAN ANTONIO, TEXAS

MASTER-CONTROL SYSTEM FOR CELL DOORS AND LOCKS

Application filed August 15, 1929. Serial No. 386,036.

This invention relates to master control systems for cell doors and locks and aims among other objects to provide improved simplified and effective selector mechanism so constructed and arranged that it automatically engages the doors as they are unlocked, with the master door-propelling means and cannot be released from the doors except when they are locked. This application involves important improvements in the selector mechanisms shown in my Patents 1,269,244 and 1,611,260.

In the accompanying drawings, showing one illustrative embodiment of the invention;

Fig. 2 is a top plan view of the mechanism in Fig. 1, the cover box or casing being shown in section;

Fig. 3 is a sectional view taken on the line 3—3 of Fig 2;

Fig. 4 is a view similar to Fig. 3, but showing the parts in a different position; and Figs. 5 and 6 are fragmentary side elevations showing parts of the mechanism in different positions.

Figure 1:
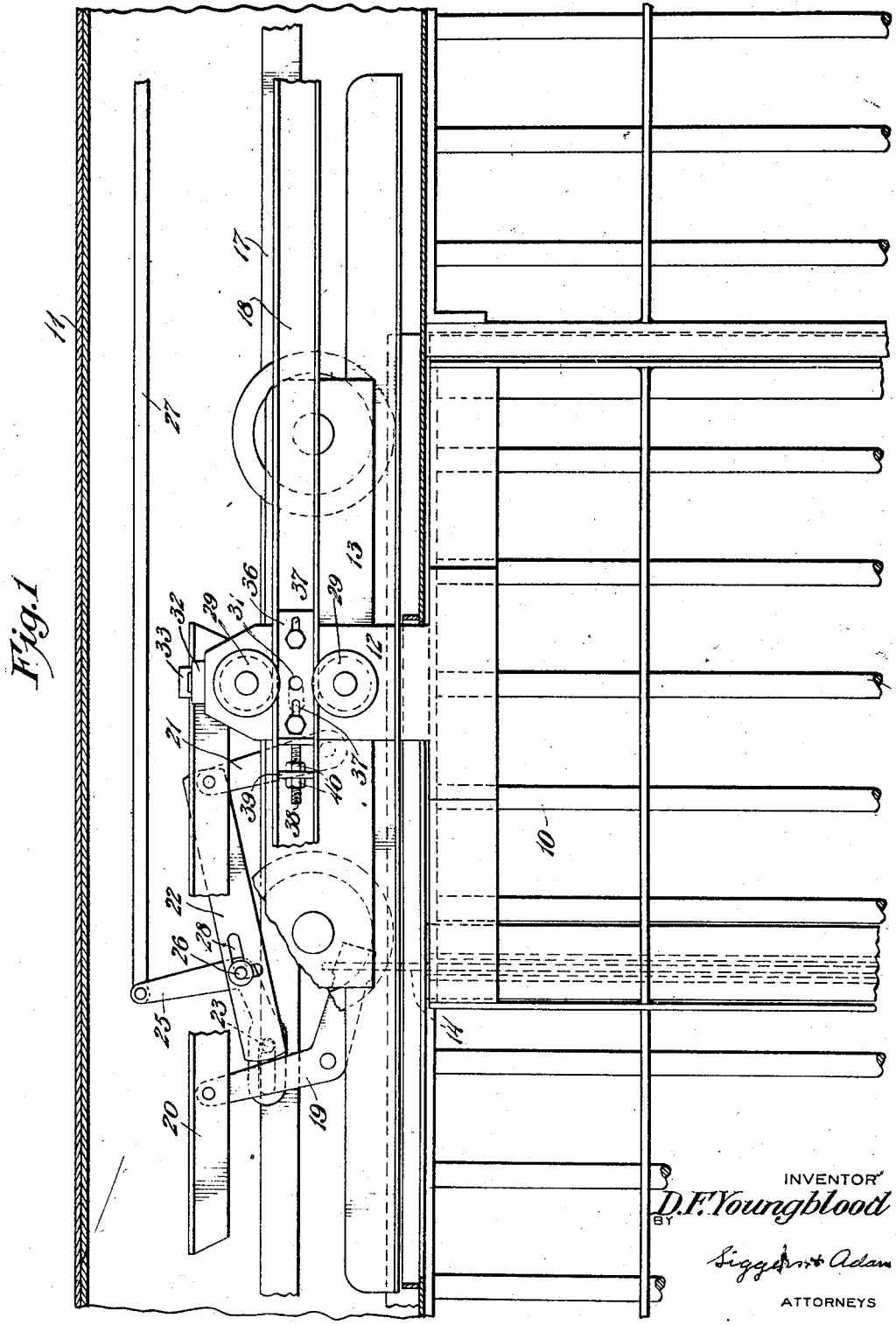
Fig. 1 is a fragmentary view partly in section showing a side elevation of the mechanism applied to one of a series of cell doors.

Referring to my aforesaid patents, it will be seen that a plurality of cell doors which are arranged in rows are adapted to be operated by a master locking bar and a master propelling bar, and selector mechanism is employed to effect the operating connections between the bars and the selected locks and doors. However, that selector mechanism has several drawbacks among which is the fact that supplemental, pivoted operating bars are employed and the arcs through which they are swung vary, depending upon the positions of the doors. This improvement greatly simplifies the mechanism by eliminating the objectionable features and also increases the reliability of the system.

Referring particularly to the drawings, the embodiment of the selector mechanism for only one cell door 10 is shown as being housed within the usual cover box 11. As shown in Fig. 1, each door is supported by a hanger 12 extending through a slot in the cover box and secured to a carriage 13 in the usual manner. Further, the door is adapted to be locked by a housed or enclosed vertical locking bar 14 which engages a notched flange 15 on the door and itself has a notch 16 (Fig. 4) to straddle the flange and release the door. The lock and the door are adapted to be operated by the master operating members in the form of bars 17 and 18 respectively which are mounted in the cover box as described in my patents, it being understood that the bars are moved endwise or longitudinally by mechanism arranged in a master control box (not shown.)

In the present example the locking bar 14 is adapted to be raised and lowered by a bell-crank 19 having one arm projecting through a vertical slot in the locking bar (Figs. 3 and 4), and the other arm is pivotally connected to a flanged link member 20 in the form of an angle bar. A rocker arm 21 is also pivotally connected to the flanged link 20 and is so arranged as to permit the link to have parallel movement; that is to say, the arm 21 is of the same length as the arm of the bell-crank 19 which is pivoted to the member 20. Pivotally connected to the member 20, conveniently by means of the same pivot pin as that for the arm 21, is a latch bar 22 which carries near its lower end a transverse bolt or pin 23 adapted to engage and rest in a notch 24 in the lock operating bar 17 (Figs. 1, 2, 5 and 6). The arrangement is such that when the pin 23 is thus engaged and the locking bar 17 is moved to the left as viewed in Fig. 1, the link 20 will be rocked to the left and thereby rock the bell crank 19 to lift the lock bar 14 to the position shown in Fig. 3, thus unlocking the door.

When the cell door is locked and is to remain locked while other selected doors are being unlocked and operated, the pin 23 on the latch bar 22 is lifted out of the notch 24 as indicated in Fig. 5. In other words, the position shown in Fig. 5 is the normal locked position of the lock selector mechanism. In Fig. 6, the selector mechanism is engaged and has been operated fully to unlock the door.

In my Patent 1,611,260 there is described both electrical and mechanical means to control the selector mechanism there shown. A series of electro-magnets or a series of hand levers may also be employed in this instance. However, for the sake of convenience in illustration, an ordinary mechanical selector to manipulate the latch bar 22 is employed. For this purpose, a bell-crank 25 is shown as being mounted on a fixed pivot pin 26 and is arranged to be operated by a link 27 connected to a suitable selector lever (not shown). The operating arm of this bell-crank has an elongated slot 25a which receives the pin 23 on the latch bar 22, the idea being to permit the pin to move longitudinally in the slot a sufficient distance to effect the operation of the lock as indicated in Fig. 6.

Referring to Figs. 1 and 6, the pivot pin 26 for the bell-crank 25 is shown as extending through an L-shaped or bayonet slot 28 in the latch bar 22. The function of this arrangement is to insure that the pin on the latch bar will remain engaged with the notch in the master lock operating bar until said latter bar is moved to its locking position. As will be seen in Fig. 5, the downwardly extending branch of the slot receives the pivot pin 26 when the latch bar 22 is raised to disengage the pin 23 from the notch 24. In Fig. 6 the longitudinal branch of the slot receives the pin 26 and prevents the latch bar from being lifted out of the notch 24 even if the jailer attempts to operate the selector lever prematurely.

Referring to Figs. 1, 3 and 4, the master door-propelling bar 18 is there shown as being channel-shaped and is guided to move between rollers 29 on the hanger 12, it being understood that this master bar moves with respect to all of the doors which are to remain locked while the selected doors are operated or opened. In the present instance, the link 20 is utilized automatically to effect the operating connection between the propelling bar and the door when the lock of that door has been unlocked and incident to the unlocking movement.

Referring to Figs. 3 and 4, the operative connection between the door and the propelling bar is conveniently effected by means of a plunger 30 adapted to be moved into and out of engagement with an opening or hole 31 through the side of the bar, this plunger being suitably guided through alined openings in the door hanger and the web of a U-shaped bracket 32. A bell-crank 33 is pivotally supported by the bracket 32 and is shown as having one arm operatively connected to the plunger 30 and the other arm overhanging and riding on the horizontal flange of the link member 20. In this instance, an arm 34 is pivoted to the same shaft or pivot pin as the bell crank and bears against the under face of the flange on the link 20, being held in engagement thereby by a compression spring 35, seated against the plunger operating arm. The idea of this construction is to permit the arm 34 to swing down in case the plunger does not register with the opening in the master propelling bar when selector mechanism is being operated, thus avoiding breakage of the parts.

In Fig. 3 the bell-crank has been swung in a clockwise direction by the movement of the link 20 so that the plunger is pushed through the hole 31 in the propelling bar. In Fig. 4, the plunger has been retracted by virtue of the lifting movement of the link. When the parts are in this position, the latch bar 22 may be lifted so that the latch pin 23 disengages the notch 24.

It is sometimes rather difficult to aline the small opening 31 in the propelling bar with the opening in the hanger plate; consequently, this opening is here shown in Fig. 1 as being elongated and an adjustable plate 36 is secured within the channel. Herein, this plate has a hole of the proper size to receive the plunger and it is secured to the web of the channel-shaped propelling bar by means of bolts passing through elongated slots 37. This plate may be adjusted in various ways but it is here shown as having an end flange to which is secured a threaded bar 38 extending through an opening in a fixed plate 39 between the flanges of the propelling bar. As shown in Fig. 1, the adjustment may be effected by means of a pair of jamb nuts 40.

Having thus described the selector mechanism as applied to one cell door without burdening this disclosure with unnecessary illustration and description of other associated mechanism, it will be understood that the same mechanism is duplicated for each door of a series of cells. Further, it will be understood that there will be as many links 27 to which are connected appropriate selector levers as there are doors to be operated. A showing of the different links 27 which may pass over the door here shown, is omitted merely for the sake of clarity.

To recapitulate the operation of the selector mechanism, the jailer will manipulate the selector levers for the selected doors so as to push the bell-cranks 25 in a counter-clockwise direction and thereby engage the latch pins 23 on the latch bars with the notches 24 on the master lock-operating bar, it being understood that the notches 24 are directly under the disengaged pins when the operating bar is in its locked position. The jailer next manipulates a lever or a hand wheel such as that disclosed in my copending application, Ser. No. 386,035 filed August 15, 1929 to the left as viewed in Fig. 1, until the parts are in the position shown in Fig. 6. The selected locking bars 14 are lifted by this movement so that the notches 16 straddle the flanges 15 to free or unlock the selected doors. Also, the plungers 30 are engaged automatically with the propelling bar 18. The jailer next manipulates a lever or hand wheel, as the case may be, to move the door-propelling bar 18 to the left as viewed in Fig. 1, until the doors are fully opened. The open doors may be locked open, as is usual, by pulling the lock operating bar backwardly to locking position.

To close the selected doors, the lock-operating bar must be moved to unlocking position to release the doors which were locked in open position. This automatically connects the open doors to the master propelling bar which is then retracted to close the open doors. When the propelling bar has reached its fully retracted position, the lock-operating bar is retracted and automatically disengages the selected plungers from the doors by virtue of the lifting movement of the flanged link member 20, thus again locking the doors. The jailer next lifts the latch bars 22 to the positions shown in Fig. 5 by manipulating the selector levers. When the latch bars are in this disengaged position, the downwardly extending branches of the slots 28 act as props to support the latch bars and prevent them moving to the left, thus supporting the pins 23 so that they are above the notches 24 in the lock-operating bar.

There are many advantages of the present improvements over the old style selector mechanism shown in my earlier patents. Chief among these is believed to be the relative simplicity and the dependability of the mechanism. Further, the mechanism is so designed as to avoid as far as possible, careless mistakes of a jailer which might result in disaster. The automatic operation of the door engaging mechanism by the novel lock-operating means and the provision of means to prevent the lock-operating mechanism from being disengaged from the master lock-operating bar until the doors are fully locked are very important features, the advantages of which cannot be over-emphasized. Jailers of long experience who are aware of the perils incident to the incarceration of criminals and who know their habits can appreciate other advantages that we are unable to point out in the short compass of this specification.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. In combination with a master operating system for cell doors and locks, selector mechanism for each door including movable latch means to effect a mechanical connection to the lock; and means connected to the movable latch means automatically to connect the door to its propelling mechanism so that it can be opened when it is unlocked, said door-connecting means being connected to the lock-actuating mechanism so that it is operated simultaneously therewith.

2. In combination with a master operating system for cell doors and locks having master lock-actuating and door-propelling members, selector mechanism for each door including movable latch means to establish an actuating connection between the master lock-actuating member and the lock; means automatically to connect the door to the door-propelling member during the movement of the lock-actuating member; and means to prevent the lock-actuating connection from being disabled until the door is closed and fully locked.

3. In combination with a master operating system for cell doors and locks having master lock-actuating and door-propelling members, selector mechanism for each door including movable latch means to establish an operative connection between the master lock-actuating member and the lock; means to manipulate the latch means to effect the connection and to disable it; means automatically to connect the door to the door-propelling member during the movement of the lock-actuating member; and means to prevent the lock-actuating connection from being disabled until the door is closed and fully locked.

4. In combination with a master operating system for cell doors and locks having master lock-operating and door-propelling members, selector mechanism for each door including lock-operating mechanism having associated means selectively movable to engage the master lock-operating bar; means to effect and to disable the operative connection; and means to connect the door to the door-propelling member actuated by the lock-operating mechanism during the unlocking movement of the lock-operating mechanism.

5. In combination with a master operating system for cell doors and locks having master lock-operating and door-propelling members, selector mechanism for each door including lock-operating mechanism having associated means selectively movable to engage the master lock-operating bar; means to effect and to disable the connection; means to connect the door to the door-propelling member operatively connected to the lock-operating mechanism so as to be actuated thereby during the unlocking movement of the lock-operating mechanism; and means to prevent the lock-operating connection from being disabled until the door is closed and fully locked.

6. In a master operating system for cell doors and locks having master door and lock-operating members, selector latch means to actuate the lock of each door; and means associated with and operated directly by the means to effect an actuating connection between the door and the door-operating member during the unlocking movement of the selector mechanism.

7. In a master operating system for cell doors and locks having master door and lock-operating members, means selectively to operate the lock of each door; a pivoted member operatively connected to the lock-operating means; and means actuated by the pivoted member automatically to connect the door to the door-propelling member when the lock-operating means is moved to unlocking position.

8. In a master operating system for cell doors and locks having master door and lock-operating members, means selectively to operate the lock of each door; a pivoted member operatively connected to the lock-operating means; and a plunger connected to the pivoted member adapted to effect a connection between the door and the door-propelling member.

9. In a master operating system for cell doors and locks having master door and lock-operating members, means selectively to operate the lock of each door; a pivoted lever connected to and operable by the lock-operating means and having a plunger movable automatically to effect a connection between the door and the door-propelling member.

10. In a master operating system for cell doors and locks having master door and lock-operating members, means selectively to operate the lock of each door; a bell-crank pivoted adjacent to the door-propelling member and operatively connected to the lock-operating means; and a plunger carried by the bell-crank adapted to be moved to effect a connection between the door and the door-propelling member when the locking means is moved to door-unlocking position.

11. In a master operating system for cell doors and locks having master lock-operating and door-propelling members, selector mechanism for each door including a pivoted lever connected to the lock; a link pivotally connected to the lever and mounted for parallel movement; a rocker arm also connected to said link; a latch bar pivotally connected with respect to said link and having means to engage the master lock-operating bar; a manually operable lever connected to said latch bar to effect the connection between said latch bar and said lock-operating bar; means to connect said door propelling bar to the door when said lock-operating mechanism is moved to unlocking position including a plunger; and mechanical connections between said plunger and said link.

12. In a master operating system for cell doors and locks having master lock-operating and door-propelling members, selector mechanism for each door including a pivoted lever connected to the lock; a link pivotally connected to the lever and mounted for parallel movement; a rocker arm also connected to said link; a latch bar pivotally connected with respect to said link and having means to engage the master lock-operating bar; a manually operable lever connected to said latch bar to effect the connection between said latch bar and said lock-operating bar; and means to connect the door to the door-propelling bar incident to the unlocking movement of said lock-operating mechanism.

13. In a master operating system for cell doors and locks having master lock-operating and door-propelling members, selector mechanism for each door including a pivoted lever connected to the lock; a link pivotally connected to the lever and mounted for parallel movement; a rocker arm also connected to said link; a latch bar pivotally connected with respect to said link and having means to engage the master lock-operating bar; a manually operable lever connected to said latch bar to effect the connection between said latch bar and said lock-operating bar; and means connected to said link to effect engagement between the door and the door-propelling bar.

14. In a master operating system for cell doors and locks having master lock-operating and door-propelling members, selector mechanism for each door including a pivoted lever connected to the lock; a link pivotally connected to the lever and mounted for parallel movement; a rocker arm also connected to said link; a latch bar pivotally connected with respect to said link and having means to engage the master lock-operating bar; a manually operable lever connected to said latch bar to effect the connection between said latch bar and said lock-operating bar; a pivoted lever adjacent to the door propelling bar connected to said link; a plunger carried by said lever and movable to connect the door to the door-propelling bar when the door-locking mechanism has been moved to its unlocked position.

15. In combination with a master operating system for cell doors and locks having master lock-operating and door-propelling members, a bell-crank connected to the lock for each door; a link carried by one arm of the bell-crank; a rocker arm also connected to the link so that it has parallel movements; a flange on the link; a latch bar pivotally connected with respect to the link and presenting a pin; said lock-operating member having a notch adapted to receive said pin; a bell-crank connected to said link and operable to move the pin into and out of engagement with said notch; a bell-crank pivoted adjacent to the door-propelling member and having a notched arm engaging the flange on said link; and a plunger on the other arm of said bell-crank adapted to be projected through a part of the door and engaged with the door-propelling bar, said door propelling bar having an opening to receive said plunger when it is projected.

16. In combination with a master operating system for cell doors and locks having master lock-operating and door-propelling members, a bell-crank connected to the lock for each door; a link carried by one arm of the bell-crank; a rocker arm also connected to the link so that it has parallel movements; a flange on the link; a latch bar pivotally connected with respect to the link and presenting a pin; said lock-operating member having a notch adapted to receive said pin; a bell-crank connected to said link to move the pin into and out of engagement with said notch; a bell-crank pivoted adjacent to the door-propelling member and having a notched arm engaging the flange on said link; a plunger on the other arm of said bell-crank adapted to be projected through a part of the door and engaged with the door-propelling bar, said door-propelling bar having an opening to receive said plunger when it is projected; and means to prevent the lock-operating mechanism from being disengaged from the master lock-operating member until the door has been fully closed and locked.

17. In a master operating system for cell doors and locks wherein the cells are arranged in series and the operating mechanism includes a master lock operating bar and a master door-operating bar arranged above the doors, lock-operating mechanism comprising a bell-crank connected to the lock; a flanged link member pivoted to one arm of the bell-crank; a rocker arm connected to the flanged member so that the link has parallel motion; a latch member pivotally connected to said rocker arm and having a pin at its opposite end adapted to engage the lock-operating bar; said lock-operating bar having a notch adapted to be engaged by said pin; a bell-crank connected to raise and lower said latch bar to move said pin into and out of engagement with the lock-operating bar; the connection between said bell-crank and said latch bar including a pin and a bayonet slot so arranged that the latch bar is held in engagement with the lock-operating bar until the parts are moved to door-locking position; and means operated by said flanged member automatically to effect a connection between the door and the master door-propelling bar as the locking mechanism is moved to its unlocked position.

18. In a master operating system for cell doors and locks, wherein the cells are arranged in series and the operating mechanism includes a master lock-operating bar and a master door-operating bar arranged above the doors, lock-operating mechanism comprising a bell-crank connected to the lock; a flanged link member pivoted to one arm of the bell-crank; a rocker arm connected to the flanged member so that it has parallel motion; a latch member pivotally connected to said rocker arm and having a pin at its opposite end adapted to engage the lock-operating bar; said lock-operating bar having a notch adapted to be engaged by said pin; a bell-crank connected to raise and lower said latch bar to move said pin into and out of engagement with the lock-operating bar; the connection between said bell-crank and said latch bar including a pin and a bayonet slot so arranged that the latch bar is held in engagement with the lock-operating bar until the parts are moved to door-locking position; and a bell-crank pivotally mounted adjacent to the master door-propelling bar and having an arm overhanging and engaging said flanged member and a spring urged arm engaging the lower face of the flanged member; a plunger connected to the other arm of said bell-crank and projecting through an opening in a part of the door; said door propelling bar having an opening alined with said plunger and through which the plunger is projected automatically when the locking mechanism is moved to its unlocking position whereby, to effect an automatic connection between the door and the door-propelling bar.

19. In a master operating system for cell doors and locks, where the cells are arranged in series and the operating mechanism includes a master lock-operating bar and a master door-operating bar arranged above the doors, lock-operating mechanism comprising a bell-crank connected to the lock; a flanged link member pivoted to one arm of the bell-crank; a rocker arm connected to the flanged member so that it has parallel motion; a latch member pivotally connected to said rocker arm and having a pin at its opposite end adapted to engage the lock-operating bar; said lock-operating bar having a notch adapted to be engaged by said pin; a bell-crank connected to raise and lower said latch bar to move said pin into and out of engagement with the lock-operating bar; the connection between said bell-crank and said latch bar including a pin and a bayonet slot so arranged that the latch bar is held in engagement with the lock-operating bar until the parts are moved to door-locking position; a lever pivoted to swing transversely with respect to the door-propelling bar and having one end operatively connected to said flanged member; a plunger loosely connected to the other end of said lever and arranged to be projected through a part of the door and said propelling bar; said propelling bar having an elongated opening alined with the plunger when the propelling bar is in its door-closing position; and a perforated adjustable plate secured to the bar and being so adjusted as to bring its perforation in exact alinement with said plunger.

20. In combination with a master operating system for cell doors and locks having master lock-operating and door-propelling bars arranged in a cover box extending above a row of doors, selector mechanism for each door including means operatively to connect the lock to the master lock-operating bar; a flanged member having parallel movement associated with said means; a bell-crank pivoted adjacent to the master propelling bar and movable in a plane transversely thereof; one of the arms of the bell-crank being arranged to engage said flanged member; a plunger connected to the other arm of said bell-crank and arranged to be projected through a part of the door and through said propelling bar incident to the unlocking movement of said locking mechanism, said propelling bar having a transverse opening to receive said plunger when it is so projected.

In testimony that I claim the foregoing as my own, I have hereto affixed my signature.

DAVID FRANKLIN YOUNGBLOOD.